US006932368B1

(12) United States Patent
Zam

(10) Patent No.: US 6,932,368 B1
(45) Date of Patent: Aug. 23, 2005

(54) APPARATUS FOR HARNESSING WIND TO DRIVE A BICYCLE

(76) Inventor: Vladimir Zam, 150 Beach 137 St., Rockaway Park, NY (US) 11694

( * ) Notice: Subject to any disclaimer, the term of this patent is extended or adjusted under 35 U.S.C. 154(b) by 17 days.

(21) Appl. No.: 10/816,446

(22) Filed: Mar. 31, 2004

(51) Int. Cl.[7] .............................................. B62J 11/00
(52) U.S. Cl. ................................................... 280/213
(58) Field of Search ............................... 280/213, 214, 280/810, 212, 288.4; 114/43, 102, 103, 102.1, 114/102.16, 102.29

(56) References Cited

U.S. PATENT DOCUMENTS

| | | | | |
|---|---|---|---|---|
| 639,107 A | * | 12/1899 | Sorensen | 280/213 |
| 947,731 A | * | 1/1910 | Couder | 280/213 |
| 2,038,166 A | * | 4/1936 | Deal | 280/213 |
| 2,443,565 A | * | 6/1948 | Land | 280/213 |
| 3,982,766 A | * | 9/1976 | Budge | 280/1 |
| 3,986,722 A | * | 10/1976 | Patterson | 280/16 |
| 4,332,395 A | * | 6/1982 | Zech | 280/213 |
| 4,441,728 A | * | 4/1984 | Schroeder | 280/213 |
| 4,735,429 A | * | 4/1988 | Beck | 280/213 |
| 5,911,427 A | * | 6/1999 | Lenz, Jr. | 280/213 |

FOREIGN PATENT DOCUMENTS

FR         2622524       * 10/1987

* cited by examiner

Primary Examiner—Anne Marie Boehler

(57) ABSTRACT

A sail attachment which when connected to the bicycle harnesses wind to drive the bicycle forward. The attachment is adapted to fit on the rear of the bicycle above its rear wheel and is securable to the bicycle seat. The attachment is provided with a wind receiving sail which when attached to the bicycle can harness wind 45 degrees from either the left or right side of the bicycle, 90 degrees from either the side of the bicycle and at the rear of the bicycle to power the bicycle.

4 Claims, 2 Drawing Sheets

APPARATUS FOR HARNESSING WIND TO DRIVE A BICYCLE

FIELD OF THE INVENTION

This invention generally relates to apparatus which when connected to a vehicle adapted for land travel utilizes the force of wind to drive such vehicle in a controlled manner and more specifically relates to apparatus including a sail attachment connectable to a bicycle for harnessing wind to drive the bicycle forward.

BACKGROUND OF THE INVENTION

Sail boats which harness wind to provide motive power have been used for centuries. Vehicles having runners secured to their bottom surfaces and having sails have utilized wind to cause the vehicles skate over surfaces of solid ice. However, while wheeled bicycles have been powered by human operators or by detachable motors, no one prior to applicant has succeeded to devising apparatus including a sail attachment connectable to a bicycle for harnessing wind to drive a bicycle forward in a controlled manner.

SUMMARY OF THE INVENTION

In accordance with the principles of this invention, apparatus is provided which is detachably connectable to a bicycle. The bicycle has a frame with front mounted handle means and rear mounted seat means. The bicycle has front and rear wheels secured thereto, the front wheel extending in front of the handle means, the rear wheel extending rearward from the seat means. Each wheel has a corresponding axle extending therethrough.

The apparatus includes a sail attachment which when connected to the bicycle harnesses wind to drive the bicycle forward. The attachment is adapted to fit on the rear of the bicycle above the rear wheel and securable to the seat means.

The apparatus employs a U shaped member having two downwardly extending legs and an upper horizontal element extending therebetween. The legs are securable non-rotatably to the rear wheel axle. A horizontal hollow tube open at both ends is secured to said element, said tube being disposed at right angles to said element. A vertical hollow mast is secured to the tube and extends upwards therefrom. A horizontal boom is secured at one end to the mast adjacent the lower end of the mast. A rectangularly shaped sail having an elongated vertical leg is secured rotatably to the mast and a short horizontal leg secured rotatably to the boom. A boom haul extends along the hypotenuse of the sail and is spaced therefrom, the boom haul being connected between the other end of the boom and the upper end of the mast.

When the attachment is attached to the bicycle, its sail can harness wind 45 degrees from either the left or right side of the bicycle, 90 degrees from either the side of the bicycle and at the rear of the bicycle to power the bicycle at speeds much faster that can be obtained when the bicycle is ridden in conventional manner.

DETAILED DESCRIPTION OF PREFERRED EMBODIMENT

Figure 1:
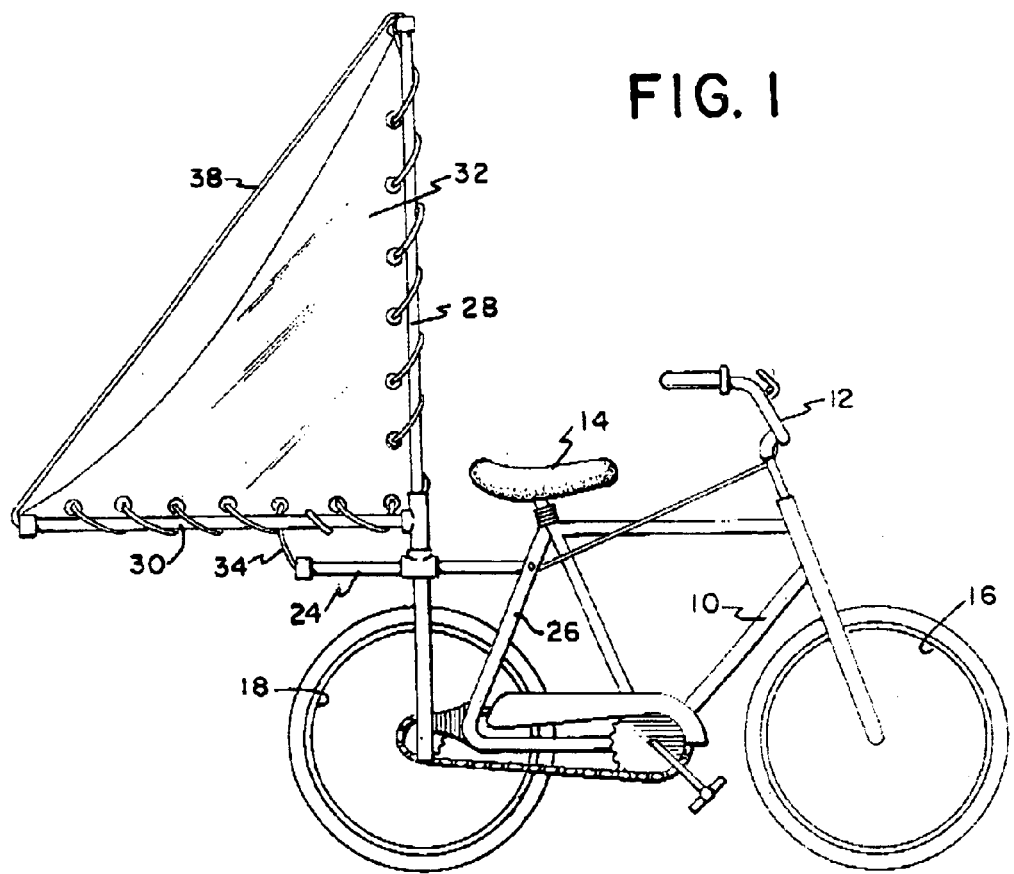
FIG. 1 is a side view of the attachment as secured to a bicycle.
Figure 2:
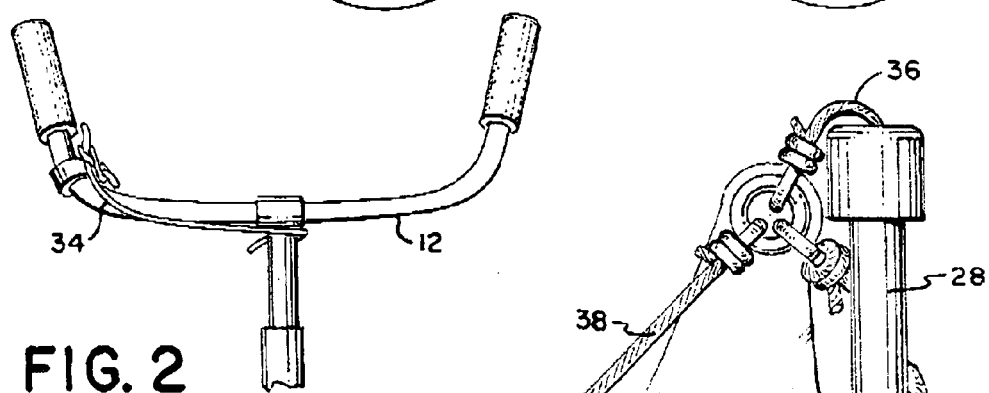
FIG. 2 is a detail front view of the handle bars of the bicycle showing connections to lines of the attachment operable by a rider of the bicycle.
Figure 3:
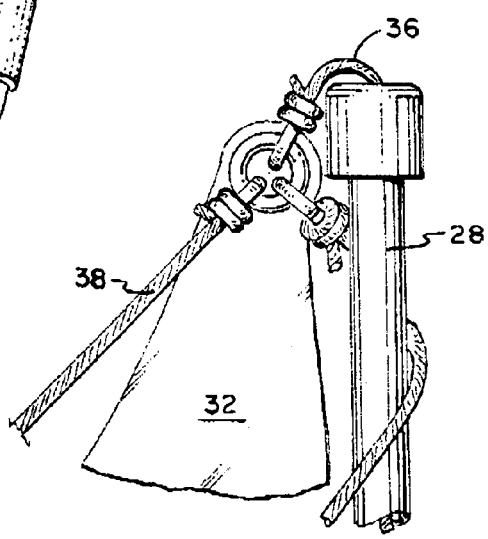
FIG. 3 is a detail view of the top of the mast as connected to the sail.
Figure 4:
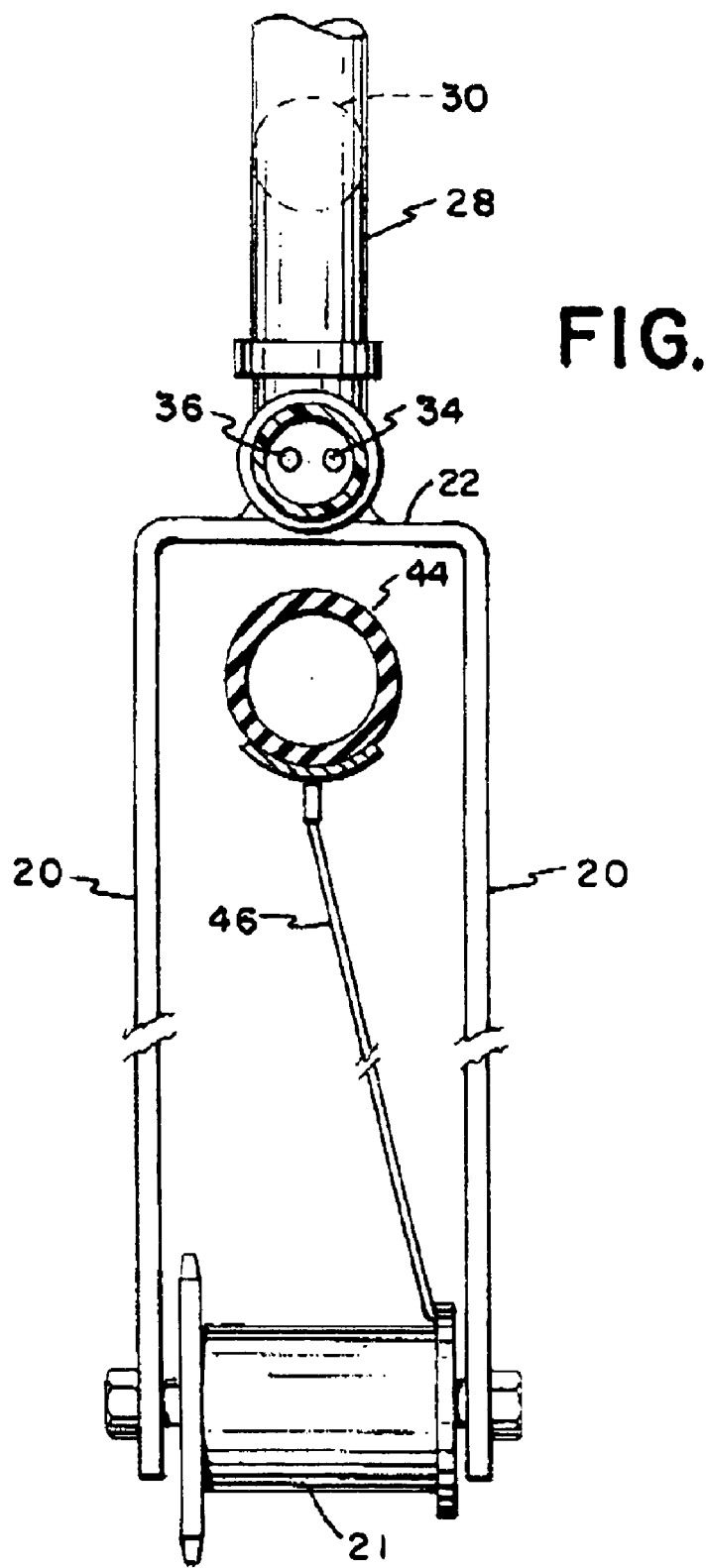
FIG. 4 is a detail rear view of the structure shown in FIG. 1.

Referring now to FIGS. 1–4, a bicycle 10 has a frame with front mounted handle bars 12 and a rear mounted seat 14. The bicycle has front and rear wheels 16 and 18 secured thereto, the front wheel 16 extending in front of the handle bars, the rear wheel 18 extending rearward from the seat, each wheel having a corresponding axle 21 extending therethrough, Rear wheel has a tire 44 and a spoke 46.

A sail attachment which when connected to the bicycle harnesses wind to drive the bicycle forward. The attachment includes a U shaped member having two downwardly extending legs 20 and an upper horizontal element 22 extending between the legs. The lower ends of the legs are securable non-rotatably to the rear wheel axle;

A horizontal hollow tube 24 open at both ends is secured to element 20 and extends at right angles thereto. One end of the tube is secured to a seat support 26 to provide a stabilizing action to prevent vibration of the attachment when in use.

A vertical hollow mast 28 is secured to the tube and extends upwards therefrom.

A horizontal boom 30 is secured at one end to the mast adjacent the upper end of the mast. The boom and mast support a rectangularly shaped sail 32. The sail has an elongated vertical leg secured rotatably to the mast and a short horizontal leg secured rotatably to the boom.

A boom haul 38 extends along the hypotenuse of the sail and is spaced therefrom. The boom haul is connected between the other end of the boom and the upper end of the mast. A first line 34 has a free end releasably connectable to the handle bars and extends through the tube for connection to the boom. The rider of the bicycle uses the line to manipulate the boom.

A second line 36 has a free end releasably connectable to the underside of the bicycle seat and extends through the tube and up the mast for connection to the sail so that the rider can raise or lower the sail.

While the invention has been described with particular reference to the detailed description and the drawing, the protection solicited is to be limited only by the terms of the claims which follow.

What is claimed is:

1. Apparatus detachably connectable to a bicycle, said bicycle having a frame with front mounted handle means and rear mounted seat means, the bicycle having front and rear wheels secured thereto, the front wheel extending in front of the handle means, the rear wheel extending rearward from the seat means, each wheel having a corresponding axle extending therethrough, said apparatus comprising:

a sail attachment which when connected to the bicycle harnesses wind to drive the bicycle forward, said attachment adapted to fit on the rear of the bicycle above the rear wheel and securable to the seat means, said attachment being provided with a triangular wind receiving sail which when attached to the bicycle can harness wind 45 degrees from either the left or right side of the bicycle, wind 90 degrees from either side of the bicycle and at the rear of the bicycle to power the bicycle;

a U shaped member having two downwardly extending legs and an upper horizontal element extending therebetween with the legs being securable non-rotatably to the rear wheel axle;

a horizontal hollow tube open at both ends secured to said element, said tube being disposed at a right angle to said element;

a vertical hollow mast secured to the tube extending upwards therefrom;

a horizontal boom secured at one end to the mast adjacent the lower end of the mast;

said sail having an elongated vertical leg that is secured rotatably to the mast and a short horizontal leg secured rotatably to the boom; and a boom haul extending along the hypotenuse of the sail and spaced therefrom, the boom haul being connected between the other end of the boom and the upper end of the mast.

2. The apparatus of claim 1 wherein one end of the tube is secured to the seat means to stabilize the structure when the apparatus is connected to the bicycle.

3. The apparatus of claim 2 further including a first line having a free end releasably connectable to the handle means and extending through the tube and connected to the boom.

4. The apparatus of claim 3 further including a second line having a free end releasably connectable to the seat means and extending through the tube and up the mast for connection to the sail.

* * * * *